United States Patent [19]

Mason

[11] 3,890,667

[45] June 24, 1975

[54] WIPING ELEMENT OF A WIPER BLADE
[75] Inventor: John A. Mason, Valparaiso, Ind.
[73] Assignee: The Anderson Company, Gary, Ind.
[22] Filed: Oct. 16, 1973
[21] Appl. No.: 406,809

[52] U.S. Cl. .......................... 15/250.42; 15/250.42
[51] Int. Cl. ............................................. B60s 1/38
[58] Field of Search........ 15/250.36, 250.38, 250.42

[56] References Cited
UNITED STATES PATENTS

| 2,907,065 | 10/1959 | MacPherson | 15/200.42 |
| 3,041,654 | 7/1962 | Anderson | 15/250.42 |
| 3,643,286 | 2/1972 | Wubbe | 15/250.42 |

FOREIGN PATENTS OR APPLICATIONS

| 1,088,410 | 10/1967 | United Kingdom | 15/250.42 |

Primary Examiner—Peter Feldman
Attorney, Agent, or Firm—Wegner, Stellman, McCord, Wiles & Wood

[57] ABSTRACT

A windshield wiper assembly having a pressure-distributing superstructure connected to a wiper blade wherein the wiper blade has a flexible backing strip element seated in grooves formed in a back portion of a resilient wiping element. Spacer means are provided in the upper surface of the grooves in the vicinity of a plurality of backing strip restraining means formed in said grooves to thereby prevent distortion of the wiping lip of the wiping element.

3 Claims, 8 Drawing Figures

PATENTED JUN 24 1975

3,890,667

WIPING ELEMENT OF A WIPER BLADE

BACKGROUND OF THE INVENTION

Certain wiper assemblies currently in use have in the resilient wiping element lateral projections or backing strip restraining means near the end portions of each of the grooves in the opposite sides of said wiping element. The purpose of the lateral projections or restraining means is to engage with the inwardly facing edges of the slot in the backing strip to limit or to prevent creeping of the backing strip relative to the wiping element. It has been found that the lateral projections or restraining means in the grooves accomplish their intended purposes of preventing creep, but at the same time they will occasionally distort the rubber or plastic away from the backing strip near the ends of the wiper blade such that in trimming the rubber or plastic, the wiping lip or edge will be uneven resulting in a poor performing product.

SUMMARY OF THE PRESENT INVENTION

The present invention relates to a wiper blade structure having a flexible backing strip or flexor seated in grooves or recesses in the back portion of a resilient wiping element and, in particular, to the addition of spacer means in the upper surfaces of the end portions of the grooves or recesses for positioning said backing strip in such a way as to prevent distortion of the wiping lip or wiping edge of the wiping element. The resilient wiping element has a wiping edge, an enlarged intermediate portion, and a retention bead along the upper edge of said intermediate portion joined with said intermediate portion by a neck portion defining oppositely facing grooves so that a retention chamber of a backing member may substantially encircle said retention bead for holding said backing member assembled with said wiping element. Abutment means are formed at each end of the grooves in the wiping element projecting outwardly relative to the base of the reduced neck portion for engaging the ends of the backing member to limit longitudinal movement of the wiping element relative to the backing member.

The wiping element has laterally outwardly extending immediately contiguous projection means and spacer means in the grooves and on the reduced neck portion, the projection means engaging the inwardly directed edges of the slot in the backing member to resist longitudinal creeping of the wiping element relative to the backing member and the spacer means engaging the upper surface of the backing member to position the backing member relative to the wiping lip to prevent distortion of said lip.

DETAILED DESCRIPTION OF THE PREFERRED EMBODIMENT

Figure 1:
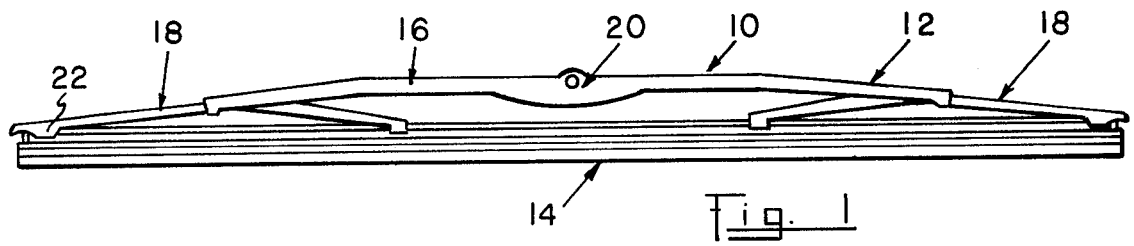
FIG. 1 is a side elevational view of a windshield wiper assembly embodying the principles of the present invention.

Referring to the drawings and, in particular, FIG. 1, a wiper assembly 10 is illustrated and has a pressure-distributing superstructure 12 operatively connected to a wiper blade 14. The superstructure 12 is comprised of a primary yoke 16 operatively connected at each end with an intermediate portion of a pair of secondary yokes 18. A connector portion 20 is provided at approximately the midportion of the primary yoke 16 for connection to the end of a wiper arm. Each secondary yoke has a pair of inwardly facing claws 22 formed at each end thereof which are adopted to engage with the outwardly projecting edges of a backing strip 24 carried by the resilient wiping element 26.

The resilient wiping element 26 has a wiping lip 28 which is connected to an enlarged intermediate portion 30 which in turn is connected to a retaining bead 32 by a reduced neck portion 34. The retention bead 32 overhangs sidewardly a portion of the intermediate portion 30 which, when combined with the reduced neck portion 34, defines a pair of outwardly facing elongate slots or grooves 36 in the opposite side walls thereof. Abutments 37 are formed at the ends of each slot or groove 36 so as to block the ends of said slots or grooves.

The backing strip or flexor 24 is preferably of extruded flexible plastic material, and includes a retention chamber 38 which functions as a receiver for the retaining bead 32 on the wiping element 26. Preferably, the chamber 38 has a relatively narrow slot 35 opening into the chamber 38 between the edges or retention lips 39.

Figure 2:
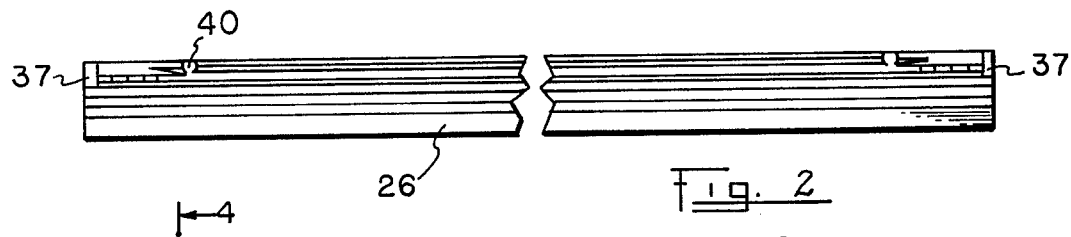
FIG. 2 is an enlarged fragmentary side elevational view of my improved resilient wiping element with the backing strip and superstructure removed.
Figure 3:
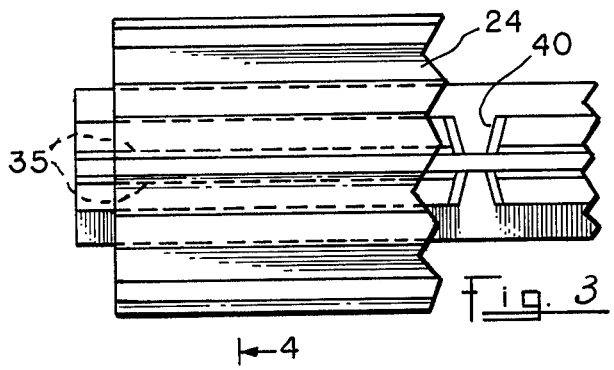
FIG. 3 is an enlarged fragmentary top plan view of one end portion of the wiper blade showing the backing strip and the resilient wiping element.
Figure 4:
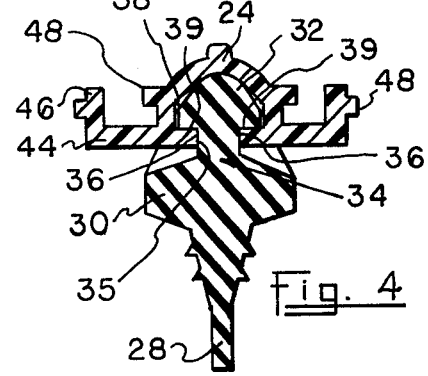
FIG. 4 is a cross-sectional view taken along the lines 4—4 of FIG. 3.
Figure 5:
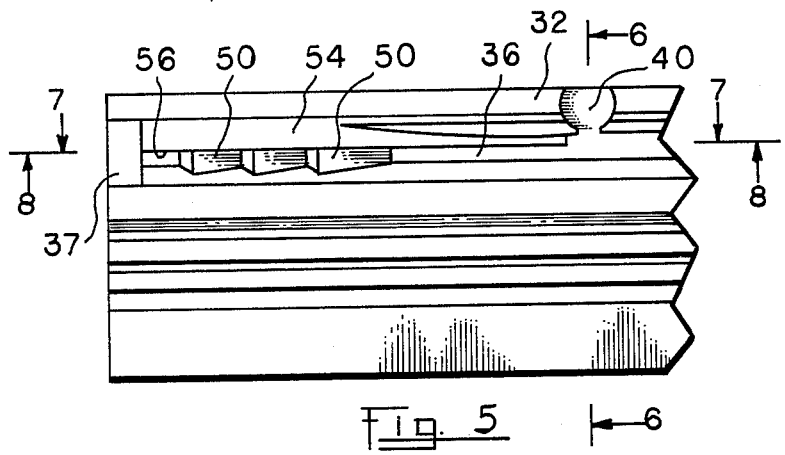
FIG. 5 is an enlarged fragmentary side elevational view of the resilient wiping element of FIG. 2.
Figure 6:
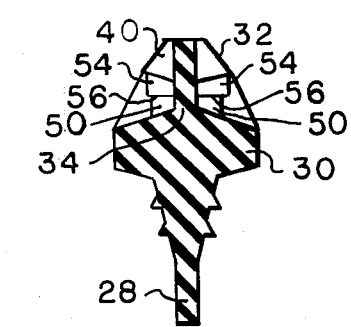
FIG. 6 is a cross-sectional view taken along the lines 6—6 of FIG. 5.
Figure 7:
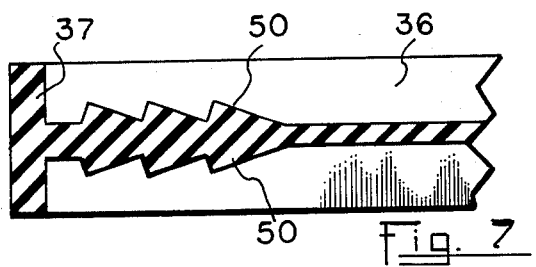
FIG. 7 is a cross-sectional view taken along the lines 7—7 of FIG. 5.
Figure 8:
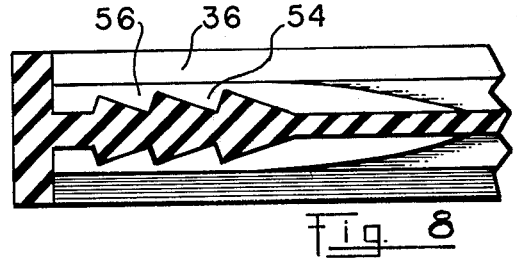
FIG. 8 is a cross-sectional view taken along the lines 8—8 of FIG. 5.

In use of the invention, the wiping element 26 is attached to the backing strip 24 with the retaining bead 32 of the wiping element disposed in the retention chamber 38, and with the neck portion 34 of the wiping element disposed in the slot 35. The wiping element 26 is attached to the backing strip 24 by threading the retaining bead 32 into the receiver chamber 38. That is, one end of the backing strip 32 is threaded through the slot or opening 40 (see FIG. 2) from the left toward the right until the backing strip abuts the abutments 37 on the right end of the wiping element 26. The left end portion of the rubber wiping element 26 is grasped and pulled to the left until the slot or opening 40 passes over the end of the backing strip so that the retaining bead 32 passes into the chamber 38 to complete the assembly of the wiping element with the backing strip.

It is to be understood that the present structure relating to the wiping element 26 can be used with any backing strip or flexor having a longitudinal slot with edges engaging in the grooves 36 in the sides of the wiping element.

The backing strip 24 is relatively wide and relatively thin, and includes a pair of opposed rails or flanges 44 extending laterally outwardly in opposite directions from the edges 39 at the bottom of the retaining bead 32 and has upstanding flanges 46 to strengthen the backing strip. Above the flanges 44 and parallel thereto is a pair of flanges 48 which are adapted to be slidably engaged by the claws 22 on the ends of the secondary yokes for attaching the pressure-distributing superstructure to the wiper blade. The backing strip is designed to be relatively flexible in the direction perpendicular to the surface being wiped and to be relatively inflexible in a plane parallel to the surface being wiped.

In order to limit creeping of the opposite end portions of the wiping element relative to the backing strip, a plurality of contiguous outwardly extending projections 50 are formed in the base of the grooves 36. The contiguous projections 50 are triangular in cross-section and are adapted to resiliently engage with the inner surfaces of the edges or retention lips 39 to prevent creeping of the wiping element 26 relative to the backing strip 24.

The structure just described forms the subject matter of a co-pending application in the name of Donald W. Stratton, Ser. No. 328,646 entitled "Anti-Creep Wiper Blade Element", filed Feb. 1, 1973 and assigned to the common assignee of the present application.

In use, the backing strip 24 with the wiping element 26 having the groups of immediate contiguous projections 50 has resulted in an excellent blade with no creeping of the wiping element relative to the backing strip. However, it has been found that during manufacturing when the wiping element is inserted in the backing strip, the projections 50 will not always seat properly and will cause a distortion in the material of the wiping element 26 between the neck portion 34 and the wiping lip 28. As a result, when the material of the wiping element is trimmed to produce the wiping edge, the distortion in the wiping element will result in a trimmed edge that will appear to be straight but upon handling and/or use the distortion will be relieved causing an uneven wiping edge which in use will produce a poorly wiped surface.

To prevent the distortion, spacer means 54 have been provided in the grooves 36 in juxtaposed relationship with respect to the projections 50 near the end portions of the wiping element 26. The spacers 54 are molded simultaneously with the molding of the material of the wiping element and extend outwardly in a sideward direction a short distance beyond the apexes of the projections 50 to provide an overhanging ledge or surface 56 facing the top surface of the enlarged intermediate portion 30. Each spacer 54 tapers gradually into the base of the groove 36 beyond the inboard most projection 50. Each spacer 54 occupies approximately one-half of the vertical height of the groove 36 with the projections 50 occupying the balance of said vertical height.

When the backing strip 24 is now assembled with the wiping element 26, the edges 39 of the slot 35 seat in the grooves 36 of the wiping element with the projections 50 pressing against said edges of the backing strip. The overhanging surface 56 of the spacers 54 engage the upper surface of the retaining lips or edges 39 and due to the limited vertical height of the projections 50 will not permit the material of the wiping element 26 to become distorted in the vicinity of the projections.

The spacers 54 locate the backing strip 24 relative to the wiping element 26 in a direction transverse to the surface to be wiped and the projections 50 together with the abutment means 37 at the ends of the wiping element 26 prevent the wiping element from creeping in either direction relative to said backing strip 24. It is now possible to trim the wiping edge 28 without any distortion in the material whereby the wiper blade will have a sharp, straight wiping edge or lip 28 which produces a superior and highly efficient wipe of a surface to be cleaned.

I claim:

1. In a wiper assembly having a wiper blade and a pressure-distributing superstructure operatively connected thereto, said wiper blade having a resilient wiping element and a flexible backing strip, said superstructure slidably engaging with said backing strip at a plurality of spaced apart locations thereon, in combination, said wiping element having a retention portion and an enlarged intermediate portion defining a pair of oppositely facing longitudinal grooves therebetween, a plurality of gripping means in the lower part of each groove near each end portion thereof, and spacer means in each groove in juxtaposed relation to each plural gripping means and disposed in the upper part of each of said grooves, said gripping means and said spacer means are formed integrally with said retention portion and said intermediate portion of said wiping element whereby the backing strip is gripped by said gripping means as said spacer means abuts the upper surface of said backing strip to prevent distortion of the wiping lip of said wiping element.

2. In a wiper assembly having a wiper blade and a pressure-distributing superstructure operatively connected thereto, said wiper blade having a resilient wiping element and a flexible backing strip operatively connected thereto, said superstructure slidably engaging with said backing strip at a plurality of spaced apart locations thereon, said wiping element having a wiping portion and a back portion with a pair of grooves extending longitudinally in the opposite sides thereof, restraining means integrally formed in the lower half of each groove near each end portion thereof for restricting relative movement between said wiping portion and said backing strip, and spacer means integrally formed in said grooves in juxtaposed relation to said restraining means whereby said spacer means abuts the upper surface of said backing strip, to prevent distortion of said wiping element by said restraining means.

3. A resilient wiper element for use in a wiper blade assembly and having a wiping portion, an intermediate portion and a retention bead, a pair of outwardly facing grooves formed between said intermediate portion and said retention portion, a plurality of immediately contiguous projections formed in the lower part of each groove near each end portion thereof, and spacer means formed in each of said grooves in juxtaposed relation to each group of said projections and disposed in the upper part of said grooves, said projections and said spacer means being formed integrally with said retention portion and said intermediate portion of said wiping element.

* * * * *